United States Patent [19]
Lagain

[11] 3,874,975
[45] Apr. 1, 1975

[54] APPARATUS FOR CUTTING AND WELDING THERMOPLASTICS MATERIALS

[76] Inventor: Georges Lagain, 14 Rue de Seine, 95100 Argenteuil, France

[22] Filed: Mar. 18, 1974

[21] Appl. No.: 452,391

[30] Foreign Application Priority Data
Mar. 26, 1973 France .............................. 73.10819

[52] U.S. Cl.................... 156/515, 83/171, 83/433
[51] Int. Cl.......................... B32b 31/00, B26d 7/00
[58] Field of Search ...... 156/515, 251, 271; 83/171, 83/431, 433

[56] References Cited
UNITED STATES PATENTS

| | | | |
|---|---|---|---|
| 2,711,779 | 6/1955 | Carland | 156/251 |
| 3,216,880 | 11/1965 | Herrington et al. | 156/271 |
| 3,245,294 | 4/1966 | Butter et al. | 83/171 |
| 3,251,252 | 5/1966 | Lefever | 83/171 |
| 3,420,727 | 1/1969 | Beck | 156/515 |

*Primary Examiner*—Douglas J. Drummond
*Attorney, Agent, or Firm*—Clelle W. Upchurch

[57] ABSTRACT

This invention relates to apparatus for cutting and welding thermoplastic materials, particularly in the form of a sheath of indefinite length to divide the sheath longitudinally into a plurality of segments of lesser width, the apparatus includes a cutting blade which may be straight or curved with means for heating it either to a constant temperature or so that different parts are heated to different temperatures. This blade cooperates with a table over the surface of which the starting sheath is passed and thus the said surface also may be flat or curved to match the blade configuration. The blade and the table are relatively moved along the longitudinal axis of the cutting blade so as to vary the length of blade in contact with the sheath. The table, when having a curved surface, may be pivotable about a point: the blade may be suspended by position-adjusting means in a plane perpendicular to the surface of such pivotable table.

9 Claims, 5 Drawing Figures

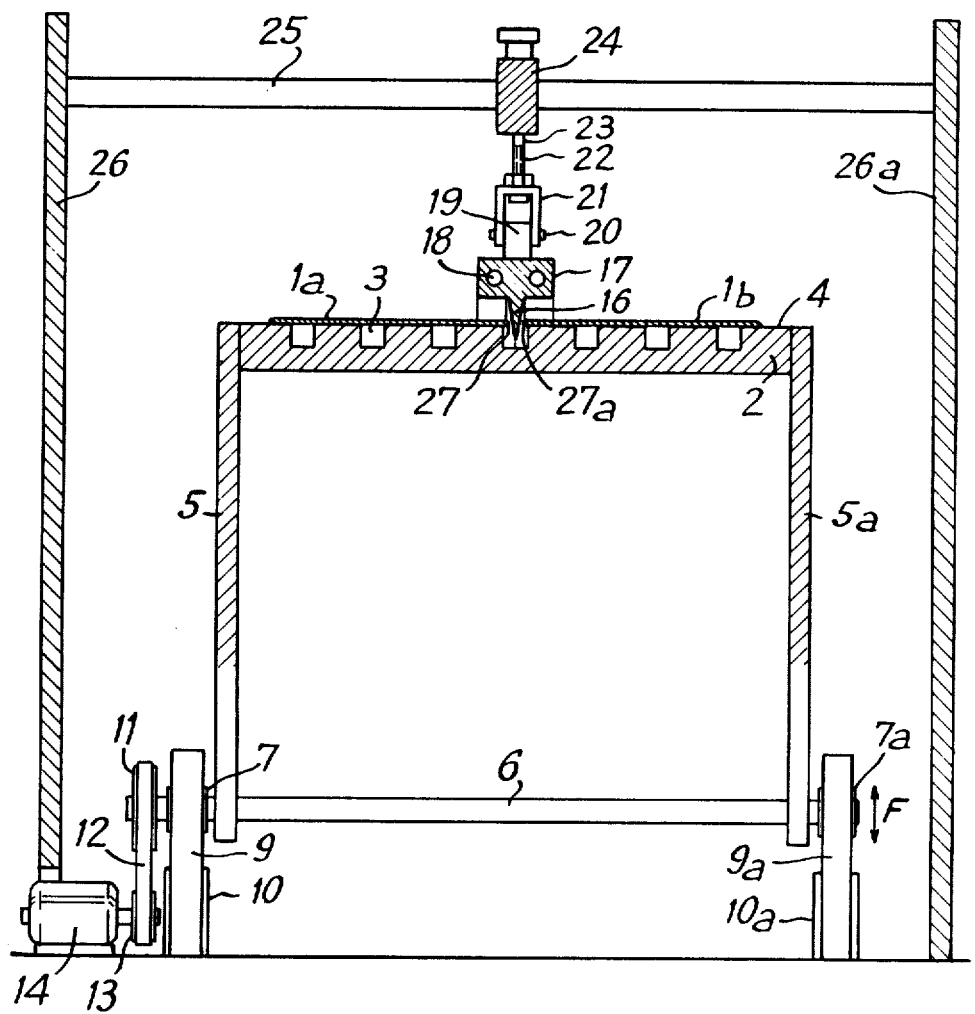

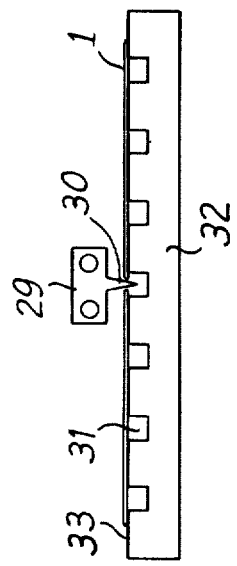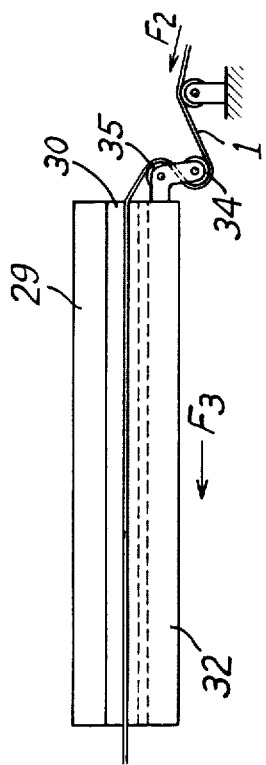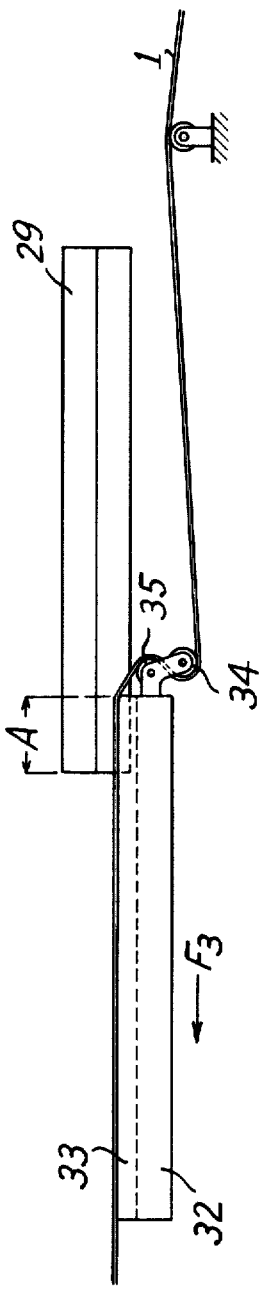

APPARATUS FOR CUTTING AND WELDING THERMOPLASTICS MATERIALS

BACKGROUND OF THE INVENTION

The present invention relates to apparatus for cutting and welding thermoplastics materials, particularly in the form of a sheath.

For manufacturing plastics bags it is known to use machines in which a predetermined length of sheath is fed forward and is then cut and welded along one edge to form a bag.

It may, however, be very advantageous to use only a single sheath and then to divide it up so as to produce a number of part sheaths, this enabling the same machine to be used for a number of sheaths and production to be considerably increased in this way.

By beginning with a single sheath which is then divided up to produce a plurality of sheaths it is possible to economise on material, since a single wide sheath is obviously more economical than a number of separate sheaths.

In the case of printed sheaths it becomes possible in this way to operate with a number of sheaths while using only one photo-electric cell to control the cutting and welding operations. Finally, when one wide sheath is used, only a single printed mark is needed when the part sheaths are subsequently cut from it, whereas when separate sheaths are used as many printed marks are needed as there are sheaths.

Means are already known for cutting and welding continuous-fed sheaths but the temperature to which the welding means are heated has to be adjusted to suit the speed of feed and the gauge of the sheath. In addition, known devices only allow light gauge sheaths to be welded.

The cutting and welding method according to the invention enables at least one constant-temperature cutting blade to be used by varying the length of cutting blade in contact with the sheath and thus the welding time. The arrangement in question has a major advantage over existing welding means due to the fact that it is far easier to keep a welding member at a constant temperature than to alter the temperature to suit different conditions of welding.

Furthermore, the apparatus according to the invention enables the temperature of the knife and thus the usable heat thereof, to be matched immediately to the speed at which the sheath moves, whereas with known apparatus it is necessary to wait for some time before a suitable temperature is reached.

A further advantage is that the apparatus according to the invention enables heavy gauge sheaths to be welded, which was not possible with known apparatus.

SUMMARY OF THE INVENTION

In accordance with the present invention the apparatus incorporates at least one elongated blade which is heated to a constant temperature and of which the tapering portion fits into one of the grooves in a table over which the plastics sheath moves in a direction which follows the longitudinal axis of the cutting blade, the said cutting blade and the said table being capable of movement relative to one another along the longitudinal axis of the cutting blade so that the length of blade in contact with the sheath may be altered.

Such an apparatus in which the table and the blade may be moved relative to one another ensures that the sheath always occupies exactly the same position in relation to the said blade.

DESCRIPTION OF THE DRAWINGS

Other features and advantages of the invention will be better understood from perusal of the following description of one embodiment given with reference to the accompanying drawings, in which:

FIG. 2 is a cross-sectional view along line II—II of FIG. 1, FIG. 3 is a side elevation of another embodiment of the cutting and welding apparatus, FIG. 4 is a cross-sectional elevation of the apparatus shown in FIG. 3, and FIG. 5 is a side elevation of the cutting and welding apparatus when the table has been moved in relation to the cutting blade.

SPECIFIC DESCRIPTION OF A PREFERRED EMBODIMENT

Figure 1:
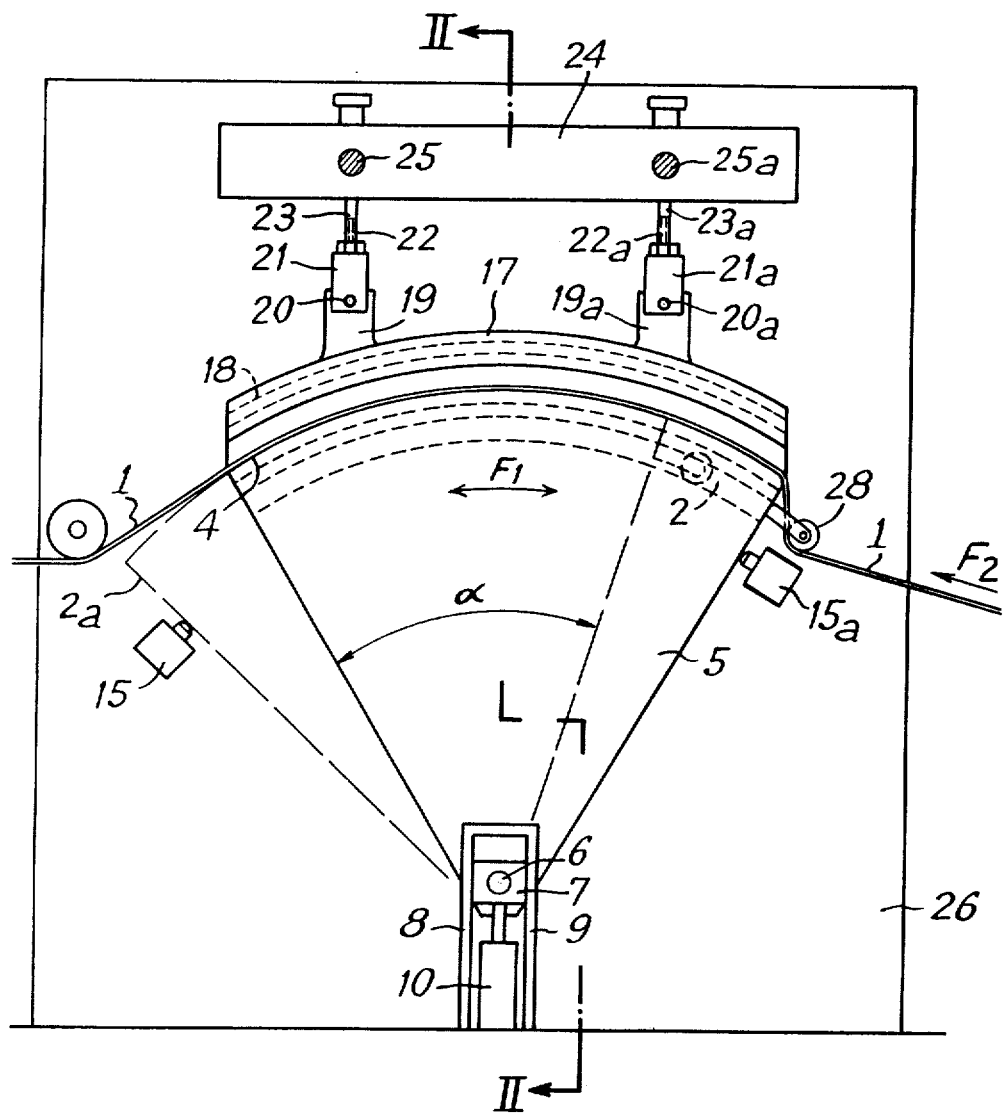
FIG. 1 is a side elevation of a cutting and welding apparatus according to the invention.

IN FIGS. 1 and 2 is shown an apparatus for cutting and welding a sheath 1 of thermoplastics material which is fed continuously over a table 2 provided with grooves 3, the surface 4 of which table is curved.

At the two ends the table 2 is mounted on end-pieces 5, 5a which are secured to a shaft 6. This shaft is mounted to rotate in bearings 7 which are capable of moving vertically in slides 8, 9 and 8a, 9a. Bearings 7, 7a are supported on rams 10, 10a which enable the said bearings, together with shaft 6 and table 2, to be moved in the directions indicated by arrow F.

At one end, shaft 6 carries a pulley 11 which is connected by a belt 12 to a pulley 13 fastened to one end of the shaft of a reduction motor 14. A belt tensioner which is not shown, since it may be of any known or desired kind and thus forms no part of the invention per se, allows shaft 6 to move while still ensuring that the belt is tensioned on the pulleys.

Via transmission 11, 12, 13, the reduction motor 14 turns the shaft 6 which revolves in bearings 7, 7a and causes the table to swing in the directions indicated by the double arrow F1. End-of-travel switches 15, 15a stop reduction motor 14 and thus limit the movement of table 2.

Above the table 2 the tapering portion 16 of a cutting blade 17 fits into one of the grooves 3, the blade being curved to match the curvature of the surface 4 of the table.

Within the blade 17 are arranged electrical resistances 18 which heat the blade 17 to a constant temperature.

The upper part of the blade 17 is provided with insulating members 19, 19a, to which clevises 21, 21a are hinged about shafts 20, 20a. Into the clevises are screwed the threaded ends 22, 22a of rods 23, 23a which are mounted to rotate in a support bar 24 which is mounted to slide on rods 25, 25a the ends of which are fastened to side-pieces 26, 26a.

By adjusting rods 23, 23a in clevises 21, 21a it is possible to regulate the height or inclination of the cutting blade 17 in relation to the table 2 so as to allow the tapering portion 16 to penetrate to a greater or lesser depth in groove 3.

When the cutting blade 17 has been heated to its constant temperature and has been adjusted to a predetermined height relative to the table 2, the sheath 1 is advanced continuously relative to the table in the direction indicated by arrow $F_2$ such that, when it touches the blade 17 which is engaged in the groove 3 in the table, the sheath is cut into two parts 1a, 1b the edges 27, 27a of which (FIG. 2) are welded as cutting progresses.

To alter the time for which the edges of the sheath are welded, table 2 is moved in the direction indicated by arrow $F_1$ to a position 12a (shown in broken lines) by pivoting shaft 6 in bearings 7, 7a. In this position the length of blade 17 in contact with sheath 1 is reduced to a length corresponding to angle α. To produce a better separation between sheath and cutting blade at the leading edge of the blade, the table 2 is provided with a roller 28 which enables the sheath to be held away from the blade in the manner shown in FIG. 1. By altering the length of the blade in contact with the sheath in the way indicated, the time for which the latter is welded is altered to suit its thickness.

Although only a single blade 17 is shown, it is clear that a plurality of blades could be used which would be suspended on rods 25, 25a in the same way.

In FIGS. 3, 4 and 5 another embodiment of the apparatus is shown schematically in which at least one straight cutting blade 29 has a tapered portion 30 which fits into one of the grooves 31 provided in a table 32. The surface 33 of the table is flat and the table can be moved relative to the cutting blade 29 in the manner shown in FIG. 5 so as to reduce the amount of sheath 1 in contact with knife 29 to length A.

At the end corresponding to the point where the sheath feeds in in the direction of arrow $F_2$, table 32 is provided with two rollers 34, 35 which guide the sheath where it is fed in an allow it to be held away form cutting blade 29 in the way shown in FIG. 5.

Although in the apparatus illustrated in FIGS. 1 to 5 the table alone is movable relative to the cutting blade, it is clear that the table could be fixed and the cutting blade movable along its longitudinal axis.

Furthermore, it is also possible to vary the temperature of the blade between leading and trailing edges while maintaining a constant temperature in the leading and trailing regions.

Various modifications could of course be made by a man skilled in the art to the apparatus or methods which have just been described as non-limiting examples without exceeding the scope of the invention as defined by the appended claims.

I claim:

1. Apparatus for cutting and welding a continuously-fed sheath made of thermoplastics material to divide said sheath into a plurality of segments of lesser width, said apparatus including at least one heatable elongated cutting blade having a tapering portion, a grooved table, means for moving said plastics sheath over said table in a direction following the longitudinal axis of said cutting blade, said tapering portion of said cutting blade fitting into one of the grooves of said table, and said cutting blade and said table being capable of movement relative to one another along the longitudinal axis of said cutting blade so as to vary the length of blade in contact with said sheath.

2. Apparatus according to claim 1, wherein said at least one cutting blade is curved and is adjustable in position, and wherein said cutting table has a curved surface and is arranged to pivot about a point, the curvature of said table surface substantially matching the curvature of said cutting blade.

3. Apparatus according to claim 2, wherein said blade is suspended by position-adjusting means in a plane perpendicular to the surface of said pivotable table.

4. Apparatus according to claim 3, wherein said cutting blade is hinged by means of insulating members to at least two clevises which have internally threaded holes in which are engaged the threaded parts of rods which are mounted to rotate in a support bar mounted to slide in a transverse direction on rods the ends of which are fastened to a supporting framework.

5. Apparatus according to claim 1, wherein said cutting blade is provided with heating means enabling said blade to be heated to a constant temperature.

6. Apparatus according to claim 2, wherein said cutting table is mounted on two side-pieces the ends of which, opposed to said cutting table, are secured to a shaft perpendicular to said cutting blade, and comprising further a reduction drive member for turning said shaft, said shaft being mounted to rotate in bearings which are vertically slidable in guide means and which are operated by means of rams which support said bearings for said rotary shaft.

7. Apparatus according to claim 1, wherein said cutting blade is straight and said table has a flat surface and is movable in a straight line following the axis of said cutting blade.

8. Apparatus according to claim 1, wherein said cutting table is fixed and said knife is movable in a direction which follows its longitudinal axis.

9. Apparatus according to claim 1, wherein said cutting blade is provided with heating means arranged to heat the leading and trailing edges of said blade to different temperatures.

* * * * *